United States Patent
Choi et al.

(10) Patent No.: US 10,548,803 B2
(45) Date of Patent: Feb. 4, 2020

(54) METHOD AND DEVICE FOR OUTPUTTING TORQUE OF WALKING ASSISTANCE DEVICE

(71) Applicant: Samsung Electronics Co., Ltd., Suwon-si, Gyeonggi-do (KR)

(72) Inventors: Byung-Kwon Choi, Seongnam-si (KR); Youngbo Shim, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 88 days.

(21) Appl. No.: 15/850,272

(22) Filed: Dec. 21, 2017

(65) Prior Publication Data
US 2019/0070060 A1    Mar. 7, 2019

(30) Foreign Application Priority Data

Sep. 4, 2017 (KR) .......... 10-2017-0112733

(51) Int. Cl.
*A61H 3/00* (2006.01)
*G05B 19/042* (2006.01)
*G05D 17/02* (2006.01)

(52) U.S. Cl.
CPC .............. *A61H 3/00* (2013.01); *G05B 19/042* (2013.01); *G05D 17/02* (2013.01); *A61H 2201/165* (2013.01); *A61H 2201/501* (2013.01); *A61H 2201/5005* (2013.01); *A61H 2201/5069* (2013.01); *A61H 2201/5071* (2013.01); *A61H 2201/5079* (2013.01); *A61H 2201/5084* (2013.01); *A61H 2201/5097* (2013.01)

(58) Field of Classification Search
CPC . G05B 19/042; G05D 17/02; A61H 2201/165
See application file for complete search history.

(56) References Cited

U.S. PATENT DOCUMENTS

| 7,154,398 B2 | 12/2006 | Chen et al. |
| 7,293,827 B2 | 11/2007 | Schrader |

(Continued)

FOREIGN PATENT DOCUMENTS

| JP | 5493142 B2 | 5/2014 |
| JP | 2017-086296 A | 5/2017 |

(Continued)

OTHER PUBLICATIONS

Hyungsub Shim et al, "Network Latency Compensation for Low Speed Projectile in First Person Shooting Game", Korean Society for computer game (KSCG), No. 15, Dec. 2008 (English Abstract in p. 1).

*Primary Examiner* — Vincent H Tran
(74) *Attorney, Agent, or Firm* — Harness, Dickey and Pierce, P.L.C.

(57) ABSTRACT

A method and device for outputting a torque of a walking assistance device is provided. The method and device may determine a degree of progress in a gait cycle based on data received through wireless communication, calculate a torque corresponding to the determined degree of progress, and output the torque to a driver of the walking assistance device. However, when the data received through wireless communication is not updated data, the method and device may determine reference data based on a reference pattern, and update the data using the determined reference data.

23 Claims, 16 Drawing Sheets

(56) References Cited

U.S. PATENT DOCUMENTS

| | | | |
|---|---|---|---|
| 2009/0036815 A1* | 2/2009 | Ido | A61H 1/0237 |
| | | | 602/23 |
| 2012/0310122 A1* | 12/2012 | Endo | A61H 1/0244 |
| | | | 601/35 |
| 2014/0107896 A1* | 4/2014 | Fehr | E02F 3/845 |
| | | | 701/50 |
| 2017/0181917 A1* | 6/2017 | Ohta | A61H 3/008 |
| 2017/0202724 A1* | 7/2017 | De Rossi | A61H 3/00 |
| 2017/0265785 A1* | 9/2017 | Vaughn | A61B 5/1123 |
| 2017/0328931 A1* | 11/2017 | Zhang | B81B 3/001 |
| 2018/0034694 A1* | 2/2018 | Farnham | H04W 4/38 |
| 2018/0036147 A1* | 2/2018 | Gregg | A61F 2/60 |
| 2018/0068033 A1* | 3/2018 | Bandyopadhyay | G06N 5/022 |
| 2018/0268264 A1* | 9/2018 | Marwah | G01D 21/00 |
| 2018/0275044 A1* | 9/2018 | Surana | G01N 19/00 |
| 2018/0375743 A1* | 12/2018 | Lee | H04L 29/08 |

FOREIGN PATENT DOCUMENTS

| | | |
|---|---|---|
| KR | 10-2015-0039386 A | 4/2015 |
| KR | 1020150083331 A | 7/2015 |
| KR | 10-2016-0062933 | 6/2016 |

\* cited by examiner

METHOD AND DEVICE FOR OUTPUTTING TORQUE OF WALKING ASSISTANCE DEVICE

CROSS-REFERENCE TO RELATED APPLICATION

This application claims under 35 U.S.C. § 119 to Korean Patent Application No. 10-2017-0112733 filed on Sep. 4, 2017, in the Korean Intellectual Property Office, the entire contents of which are incorporated herein by reference in their entirety.

BACKGROUND

1. Field

At least one example embodiment relates to a torque outputting method and/or device. For example, at least some example embodiments relate to a method and/or device for outputting a torque of a walking assistance device.

2. Description of the Related Art

A recent issue of aging societies has contributed to a growing number of people who experience inconvenience and pain from reduced muscular strength or joint problems due to aging. Thus, there is a growing interest in walking assistance devices that enable elderly users or patients with reduced muscular strength or joint problems to walk with less effort. In addition, walking assistance devices that may increase muscular strength of human bodies are under development for military and other purposes.

SUMMARY

Some example embodiments relate to a method of outputting a torque of a walking assistance device.

In some example embodiment, the method may include loading data associated with the walking assistance device, the data being received via wireless communication, the loading including, determining whether the data is updated, determining reference data of a reference pattern based on the data in response to the data not being updated, and updating the data using the reference data; determining a degree of progress in a gait cycle based on the data; calculating a torque corresponding to the degree of progress; and outputting the torque to a driver of the walking assistance device.

In some example embodiments, the data received through the wireless communication has a periodic pattern corresponding to the gait cycle.

In some example embodiments, the determining whether the data is updated data includes determining whether the data is updated data using an identifier of the data.

In some example embodiments, the identifier of the data includes at least one of a field indicating whether the data has been loaded, and a timestamp of the data.

In some example embodiments, the determining the reference data of the reference pattern includes generating a normalized pattern by normalizing pieces of data including the data in a set period to correspond to the reference pattern; determining a target interval of the reference pattern such that the target interval corresponds to the normalized pattern; and determining the reference data based on the target interval.

In some example embodiments, the generating of the normalized pattern includes normalizing a minimum value and a maximum value of the pieces of data in the set period such that the minimum value and the maximum value of the pieces of data correspond to a minimum value and a maximum value of the reference pattern, respectively.

In some example embodiments, the set period corresponds to one period of the reference pattern.

In some example embodiments, the determining the reference data based on the target interval includes setting last data in the target interval as the reference data.

In some example embodiments, the data is a measurement of a joint angle of a user of the walking assistance device.

In some example embodiments, the joint angle is at least one of a shoulder joint angle, a hip joint angle, a knee joint angle, and an ankle joint angle of the user.

In some example embodiments, the loading of the data further includes determining the reference pattern among a plurality of stored reference patterns based on a current walking mode of the walking assistance device.

Some example embodiments relate to a non-transitory computer-readable medium including computer-readable instructions executable by a computer to perform the method of outputting a torque of a walking assistance device.

Some example embodiments relate to a device for outputting a torque of a walking assistance device.

In some example embodiments, the device includes a memory configured to store a program; and a processor configured to execute the program to output a torque by, loading data associated with the walking assistance device, the loading including, determining whether the data is updated, determining reference data of a reference pattern based on the data in response to the data not being updated, and updating the data using the reference data; determining a degree of progress in a gait cycle based on the data; calculating a torque corresponding to the degree of progress; and outputting the torque to a driver of the walking assistance device.

Some example embodiments relate to a data updating method to update data having a periodic pattern.

In some example embodiments, the data updating method includes loading data received through wireless communication; determining whether the data is updated data; determining reference data of a reference pattern based on the data, in response to the data not being updated; and updating the data using the reference data.

In some example embodiments, the determining whether the data is updated data includes determining whether the data is updated data using an identifier of the data.

In some example embodiments, the identifier of the data includes at least one of a field indicating whether the data has been loaded and a timestamp of the data.

In some example embodiments, the determining the reference data of the reference pattern includes: generating a normalized pattern by normalizing pieces of data including the data in a set period to correspond to the reference pattern; determining a target interval of the reference pattern such that the target interval corresponds to the normalized pattern; and determining the reference data based on the target interval.

In some example embodiments, the generating of the normalized pattern includes normalizing a minimum value and a maximum value of the pieces of data in the set period such that the minimum value and the maximum value of the pieces of data correspond to a minimum value and a maximum value of the reference pattern, respectively.

In some example embodiments, the set period corresponds to one period of the reference pattern.

In some example embodiments, the determining the reference data based on the target interval includes setting last data in the target interval to be the reference data.

In some example embodiments, the data is a measurement of a joint angle of a user of a walking assistance device, the walking assistance device configured to calculate a torque based on the data.

In some example embodiments, the joint angle is at least one of a shoulder joint angle, a hip joint angle, a knee joint angle, and an ankle joint angle of the user.

In some example embodiments, the walking assistance device is configured to determine a degree of progress in a gait cycle of the walking assistance device based on the data, and to calculate the torque based on the degree of progress.

Some example embodiments relate to a non-transitory computer-readable medium including computer-readable instructions executable to cause a computer to perform the data updating method to update data having a periodic pattern.

Some example embodiments relate to a data updating device.

In some example embodiments, the data updating devices includes a memory configured to store a program; and a processor configured to execute the program to update data by, loading data received through wireless communication; determining whether the data is updated data; determining reference data of a reference pattern based on the data, in response to the data not being updated; and updating the data using the reference data.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
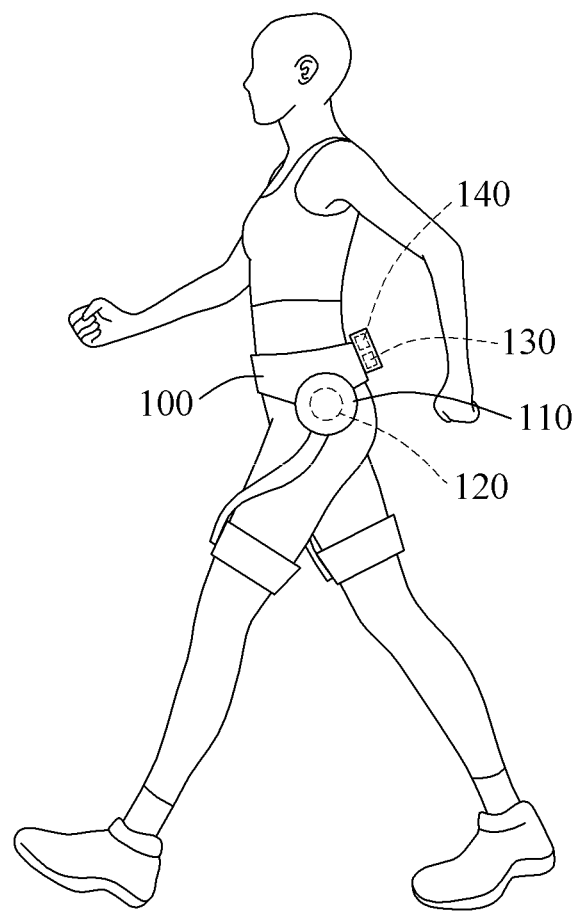
FIGS. 1 and 2 are diagrams illustrating an example of a walking assistance device according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Various example embodiments will now be described more fully with reference to the accompanying drawings in which some example embodiments are shown.

Figure 2:
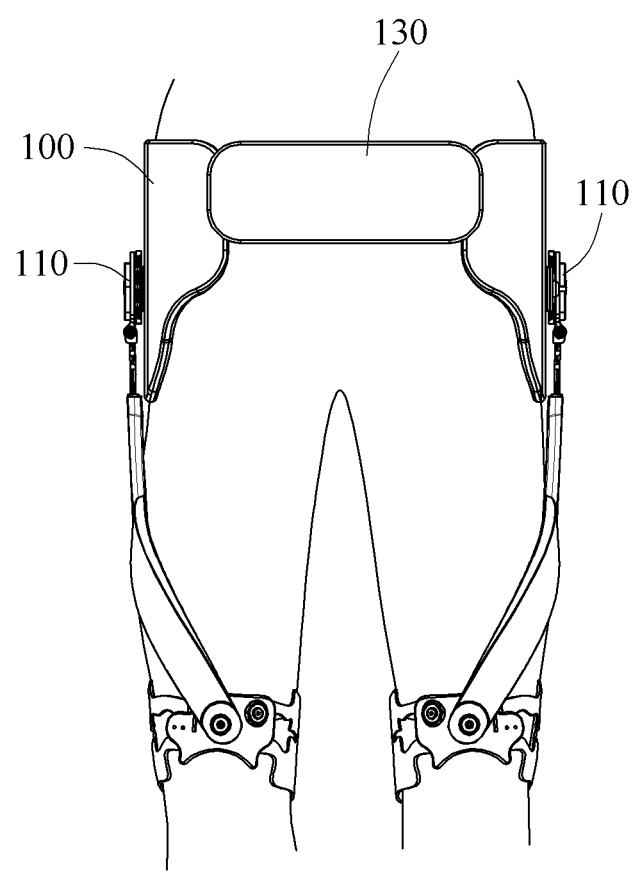

FIGS. 1 and 2 are diagrams illustrating an example of a walking assistance device according to at least one example embodiment.

Referring to FIG. 1, a walking assistance device 100 may be worn around or on a user to assist the user with walking. The walking assistance device 100 may be a wearable device.

Although FIG. 1 illustrates a hip-type walking assistance device, a type of a walking assistance device may not be limited to the illustrated example and the walking assistance device may be provided in any type, for example, a type supporting all lower limbs and a type supporting a portion of the lower limbs. Also, the walking assistance device may be of one type among a type supporting a portion of lower limbs, a type supporting a lower body up to a knee, a type supporting a lower body up to an ankle, and a type supporting a whole body.

Although example embodiments to be described hereinafter with reference to FIG. 1 and other accompanying drawings may be applied to the illustrated hip-type walking assistance device, a type of a walking assistance device to which the example embodiments are applicable may not be limited to such an illustrated type, and thus the example embodiments may also be applicable to all types of devices designed to assist a user with walking.

Referring to FIG. 1, the walking assistance device 100 includes a driver 110, a sensor 120, an inertial measurement unit (IMU) 130, and a controller 140.

The driver 110 may drive a hip joint of the user. Here, driving a joint may mean that applying torque or power to help the joint to move. For example, the driver 110 may be disposed on a right hip portion and/or a left hip portion of the user. The driver 110 may be additionally disposed on a knee portion and an ankle portion of the user. The driver 110 includes a motor that generates a rotational torque.

The sensor 120 may include one or more sensors. The sensor 120 may measure an angle of the hip joint of the user when the user walks. Information associated with the angle of the hip joint sensed by the sensor 120 may include an angle of a right hip joint, an angle of a left hip joint, a difference between the angles of both hip joints, and a movement direction of the hip joint. For example, the sensor 120 may be disposed in the driver 110. The sensor 120 may additionally measure an angle of a knee and/or an angle of an ankle of the user based on a location of the sensor 120.

The sensor 120 may include a potentiometer that senses an R-axis joint angle and an L-axis joint angle, and an R-axis joint angular velocity and an L-axis joint angular velocity based on a walking motion of the user.

The IMU 130 may measure acceleration information and posture information when the user walks. For example, the IMU 130 may sense an X-axis acceleration, a Y-axis acceleration, and a Z-axis acceleration, and an X-axis angular velocity, a Y-axis angular velocity, and a Z-axis angular velocity based on a walking motion of the user.

The walking assistance device 100 may detect a point at which a foot of the user lands based on the acceleration information measured by the IMU 130.

A pressure sensor (not shown) may be disposed on a sole of the foot of the user to detect a point in time at which the foot of the user lands.

In addition to the sensor 120 and the IMU 130 described above, the walking assistance device 100 may further include other sensors, for example, an electromyogram (EMG) sensor, which may sense a change in a quantity of motion of the user or a change in a biosignal based on a walking motion of the user.

As discussed below with reference to FIG. 3, the controller 140 may include a processor and a memory. The memory may contain computer readable code that, when executed by the processor, configures the processor as a special purpose processor to update periodic data based on reference data, when new periodic data is not obtained, and/or calculate and output a torque of the walking assistance device 100 based on the same.

The controller 140 may control the driver 110 such that the driver 110 may output a torque, or an assistance force or an assistance torque, to assist the user with walking. For example, in the hip-type walking assistance device as illustrated in FIG. 1, two drivers may be provided as the driver 110 with one being on a left hip and the other being on a right hip of the user, and the controller 140 may output a control signal to control the driver 110 to generate the torque.

The driver 110 may generate the torque based on the control signal output from the controller 140.

The torque may be set by an external source, or by the controller 140.

For example, as described above, the walking assistance device 100 may include the driver 110 for a right leg and the driver 110 for a left leg of the user.

In such an example, the controller 140 may be designed to control the drivers 110. When the controller 140 is designed to control only one of the drivers 110, a plurality of controllers may be provided as the controller 140 each configured to control a corresponding one of the drivers 110. Alternatively, the controller 140 may be designed to control each of the drivers 110.

Figure 3:
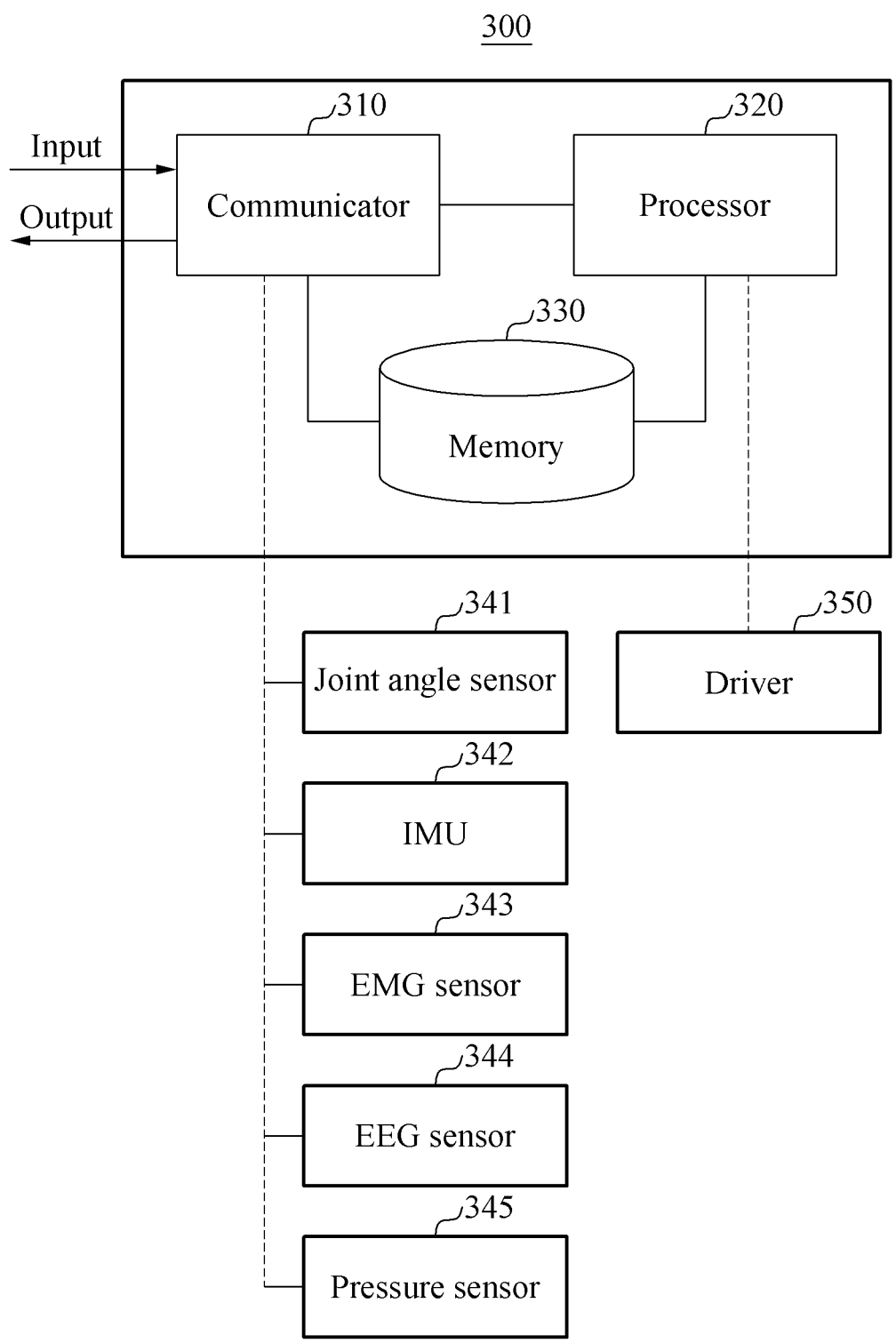
FIG. 3 is a diagram illustrating an example of a device for outputting a torque of a walking assistance device according to at least one example embodiment.

FIG. 3 is a diagram illustrating an example of a device for outputting a torque of a walking assistance device according to at least one example embodiment. The device for outputting a torque of a walking assistance device will be hereinafter referred to as a torque outputting device for simplicity.

Referring to FIG. 3, a torque outputting device 300 includes a communicator 310, a processor 320, and a memory 330. For example, the torque outputting device 300 may be included in the controller 140 described above with reference to FIGS. 1 and 2.

The communicator 310 may be connected to the processor 320 and the memory 330 to exchange data. The communicator 310 may be connected to an external device to exchange data. Hereinafter, "exchanging A" or "transmitting and receiving A" may mean exchanging, or transmitting and receiving, information or data that indicates A.

The communicator 310 may be embodied by a circuitry in the torque outputting device 300. For example, the communicator 310 may include an internal bus and an external bus. In some example embodiments, the communicator 310 may include one or more transmitters and/or receivers. The transmitters are devices that include hardware and any necessary software for transmitting signals via the associated interface to other network elements in the network environment. The receivers are devices that include hardware and any necessary software for receiving signals via the associated interface to other network elements.

The communicator 310 may be used to connect the torque outputting device 300 and the external device. The communicator 310 may be an interface. The communicator 310 may receive data from the external device, and transmit the received data to the processor 320 and the memory 330. For example, the communicator 310 may receive data from sensors connected through wired or wireless communication. The sensors may be at least one of a joint angle sensor 341, an IMU 342, an EMG sensor 343, an electroencephalogram (EEG) sensor 344, or a pressure sensor 345 The data used herein may be a value measured by each of the sensors. For example, in a case in which the joint angle sensor 341 is disposed on a hip joint of a user, data of the joint angle sensor 341 may be a measured hip joint angle. For another example, in a case in which the joint angle sensor 341 is disposed on a shoulder of the user, data of the joint angle sensor 341 may be a measured shoulder joint angle. For still another example, in a case in which the pressure sensor 345 is disposed on a heel of the user, data of the pressure sensor 345 may be a pressure applied to the heel of the user.

The processor 320 may process data received by the communicator 310 and data stored in the memory 330.

The term "processor" used herein refers to a data processing device embodied by hardware including a circuit of a physical structure to perform desired operations. For example, the desired operations may include codes or instructions included in a program. The data processing device embodied by hardware may include, for example, a microprocessor, a central processing unit (CPU), a processor core, a multi-core processor, a multiprocessor, an application-specific integrated circuit (ASIC), and a field programmable gate array (FPGA).

The processor 320 may execute computer-readable codes, for example, software, that are stored in a memory, for example, the memory 330, and instructions from the processor 320. The computer-readable code, when executed by the processor 320, may configures the processor 320 as a special purpose processor to update periodic data based on reference data, when new periodic data is unobtainable, and/or calculate and output a torque of the walking assistance device 100 based on the same.

The memory 330 may store the data received by the communicator 310 and the data processed by the processor 320. For example, the memory 330 may store the program. The program to be stored may be a set of syntaxes that may be coded to output a torque of the walking assistance device and implemented by the processor 320.

The memory 330 may include at least one volatile memory and nonvolatile memory, a random access memory (RAM), a flash memory, a hard disk drive, or an optical disc drive.

The memory 330 may store a command set, for example, software, to operate the torque outputting device 300. The command set used to operate the torque outputting device 300 may be executed by the processor 320.

The communicator 310, the processor 320, and the memory 330 will be described hereinafter in greater detail with reference to FIGS. 4 through 13.

Figure 4:
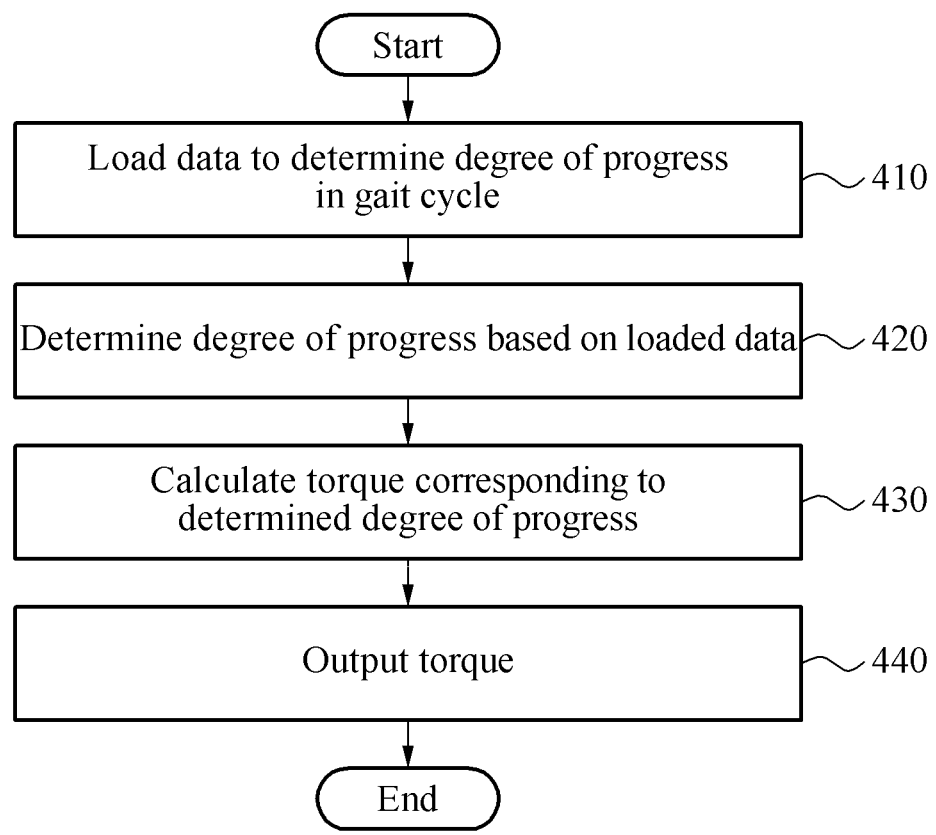
FIG. 4 is a flowchart illustrating an example of a method of outputting a torque of a walking assistance device according to at least one example embodiment.

FIG. 4 is a flowchart illustrating an example of a method of outputting a torque of a walking assistance device according to at least one example embodiment. The method of outputting a torque of a walking assistance device will be hereinafter referred to as a torque outputting method for simplicity.

Operations 410 through 440 to be described hereinafter may be performed by the torque outputting device 300 described above with reference to FIG. 3.

Referring to FIG. 4, in operation 410, the processor 320 loads data to determine a degree of progress in a gait cycle that indicates a walking situation or a walking motion of a user of a walking assistance device.

For example, the communicator 310 may receive data from a sensor connected through wireless communication, and store the received data. The wireless communication used herein may include Bluetooth, WiFi, and Zigbee, but not limited thereto. The processor 320 may load data that was received by the communicator 310. The processor 320 may load the data from the communicator 310 and/or the memory 330. The loaded data may be data that is most recently received by the communicator 310 from the sensor. The processor 320 may simultaneously load pieces of data received from a plurality of sensors. A method of loading data will be described hereinafter in greater detail with reference to FIGS. 8 through 12. The data received by the communicator 310 and loaded by the processor 320 may be a measurement obtained by measuring a joint angle of the user of the walking assistance device. For example, the joint angle may be at least one of a shoulder joint angle, a hip joint angle, a knee joint angle, or an ankle joint angle. The data may be used to calculate a torque of the walking assistance device.

In operation 420, the processor 320 determines the degree of progress in the gait cycle based on the loaded data. The processor 320 may determine the degree of progress in the gait cycle corresponding to a current walking motion of the user using data measured by at least one sensor.

For example, the processor 320 may determine the degree of progress in the gait cycle as a percentage within a range of 0% to 100%. A method of determining a degree of progress in a gait cycle will be described hereinafter in greater detail with reference to FIGS. 5 and 6.

In operation 430, the processor 320 calculates a torque corresponding to the determined degree of progress. The torque may be output by the driver 350 described above with reference to FIG. 3. The torque output by the driver 350 may generate an assistance force to assist the user with walking. For example, the processor 320 may calculate the torque based on a location of the driver 350. The processor 320 may calculate each of a torque for the driver 350 that may act on a hip joint of the user, a torque for the driver 350 that may act on a knee joint of the user, and a torque for the driver 350 that may act on an ankle joint of the user.

The processor 320 may also calculate the torque using a torque profile. A method of calculating a torque using a torque profile will be described hereinafter in greater detail with reference to FIG. 7.

In operation S440, the driver 350 may output the calculated torque to assist the user with walking.

Figure 5:
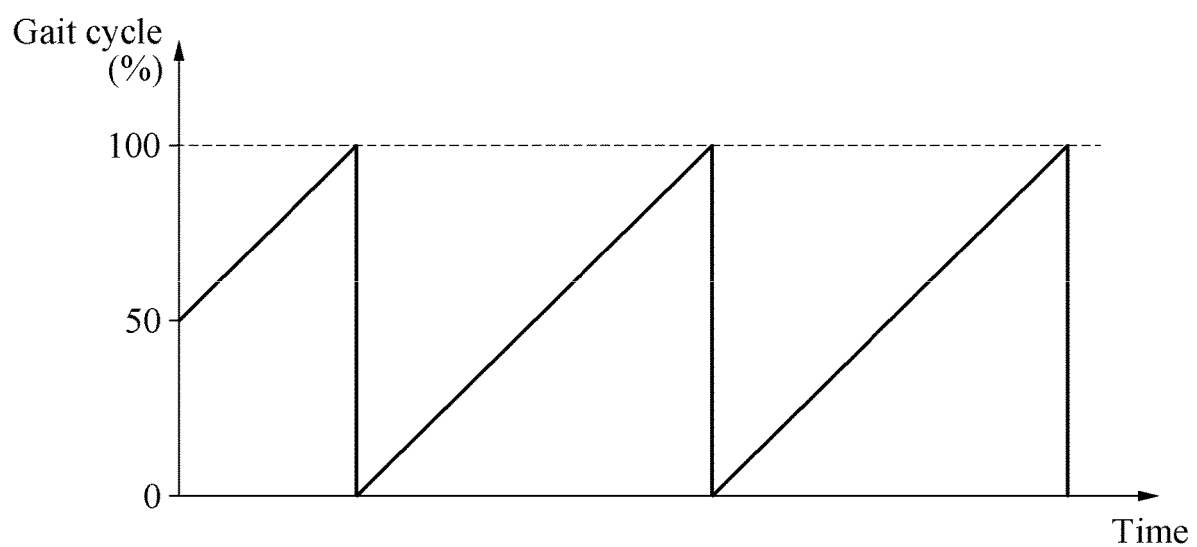
FIG. 5 is a graph illustrating an example of a gait cycle according to at least one example embodiment.

FIG. 5 is a graph illustrating an example of a gait cycle according to at least one example embodiment.

A gait cycle illustrated in FIG. 5 is a desired gait cycle that may be obtained from a gait start time. In such a desired gait cycle, a value may increase linearly from a point in time at which a user starts walking.

Figure 6:
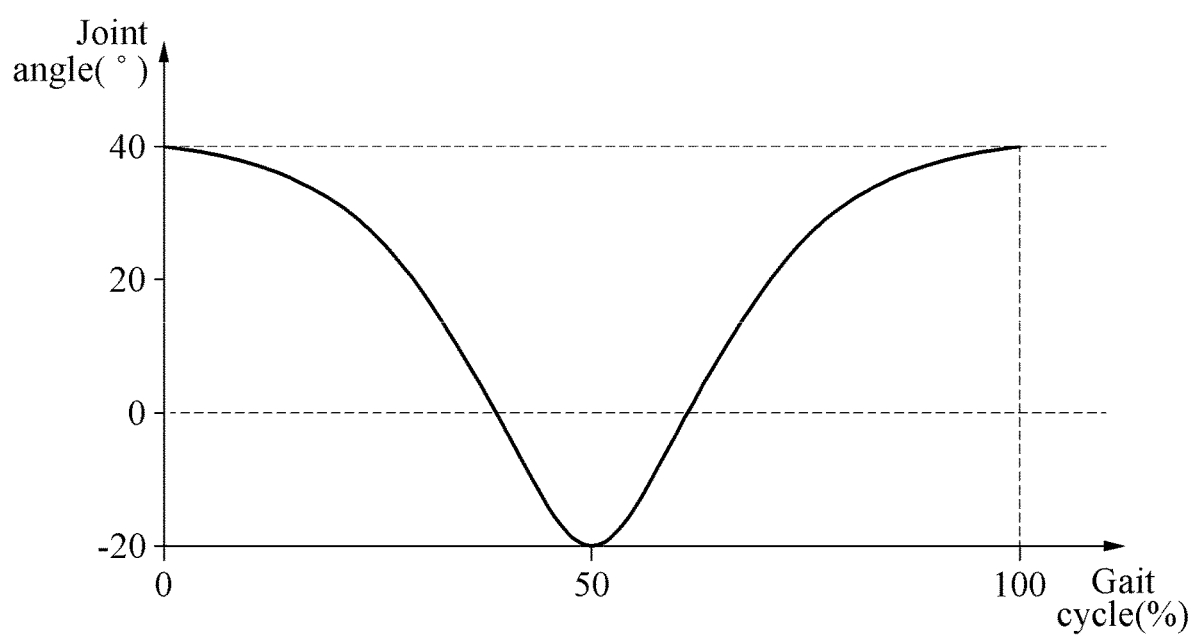
FIG. 6 is a graph illustrating an example of a reference trajectory of a hip joint angle in a gait cycle according to at least one example embodiment.

FIG. 6 is a graph illustrating an example of a reference trajectory of a hip joint angle in a gait cycle according to at least one example embodiment.

Referring to FIG. 6, an interval in which a hip joint angle has a positive value may indicate that a leg of a user is ahead of a center axis of the user, and an interval in which the hip joint angle has a negative value may indicate that the leg of the user is behind the center axis of the user. As illustrated in FIG. 6, a reference trajectory is set with a maximum joint angle of 40 degrees (°) and a minimum joint angle of −20°.

According to at least one example embodiment, the processor 320 may determine a degree of progress in a gait cycle using a particularly-shaped adaptive oscillator (PSAO). The PSAO refers to a module for signal processing, the PSAO may use a measured joint angle as an input and a degree of progress in a gait cycle as an output.

The PSAO may obtain angles from a plurality of oscillators included therein, each having an offset, a fundamental frequency, or a frequency modulated from the fundamental frequency. The plurality of oscillators may have respective phases and amplitudes. The frequency modulated from the fundamental frequency may be an integer multiple frequency of the fundamental frequency.

For example, the processor 320 may continuously determine the gait cycle using the PSAO such that the processor 320 determines the degree of progress in the gait cycle based on a trajectory of a joint angle.

Although using the PSAO is discussed above to determine the degree of progress, how to determine the degree of progress may not be limited thereto. For example, the processor 320 may implement a finite state machine (FSM), or implement both the PSAO and the FSM to determine the degree of progress.

For example, the processor 320 may determine the degree of progress in the gait cycle with respect to a transition among a desired (or, alternatively, a predetermined) number of gait states included in the FSM based on the joint angle. In the FSM, a gait cycle may be mapped with respect to a gait state in advance. For example, a gait cycle 0% may mapped to a point in time at which a stance is started, a gait cycle 60% may be mapped to a point in time at which a swing is started, and a gait cycle 100% may be mapped to a point in time immediately before a stance is started.

Further still, the processor 320 may determine the degree of progress in the gait cycle by determining a current gait state in the gait cycle based on the joint angle using the PSAO and the FSM in parallel.

Figure 7:
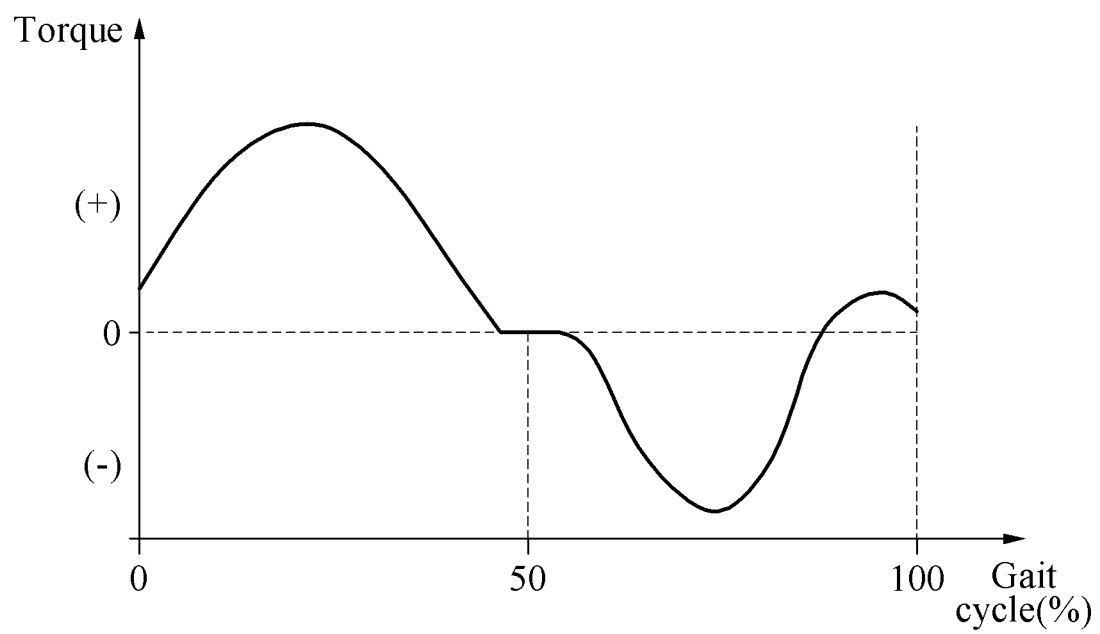
FIG. 7 is a graph illustrating an example of a torque profile set for a gait cycle according to at least one example embodiment.

FIG. 7 is a graph illustrating an example of a torque profile set for a gait cycle according to at least one example embodiment.

Referring to FIG. 7, when a current gait cycle is obtained, an assistance torque corresponding to the obtained gait cycle may be calculated. For example, in case in which a degree of progress in the current gait cycle is 60%, a torque corresponding to the degree of progress, which is 60%, may be calculated.

A torque having a positive value may provide a force in a direction in which a leg of a user moves from front to back. Conversely, a torque having a negative value may provide a force in a direction in which the leg of the user moves from back to front.

The graph of FIG. 7 illustrates a torque based on a reference trajectory, and a torque to be calculated may vary based on a trajectory of an obtained joint angle. For example, in a case in which a measured walking frequency is greater than a desired (or, alternatively, a preset) walking frequency, the processor 320 may calculate the torque to increase.

Although an example of how to calculate a torque corresponding to a degree of progress in a gait cycle using a torque profile is described above, a method of calculating the torque corresponding to the degree of progress may not be limited to the illustrated example.

Figure 8:
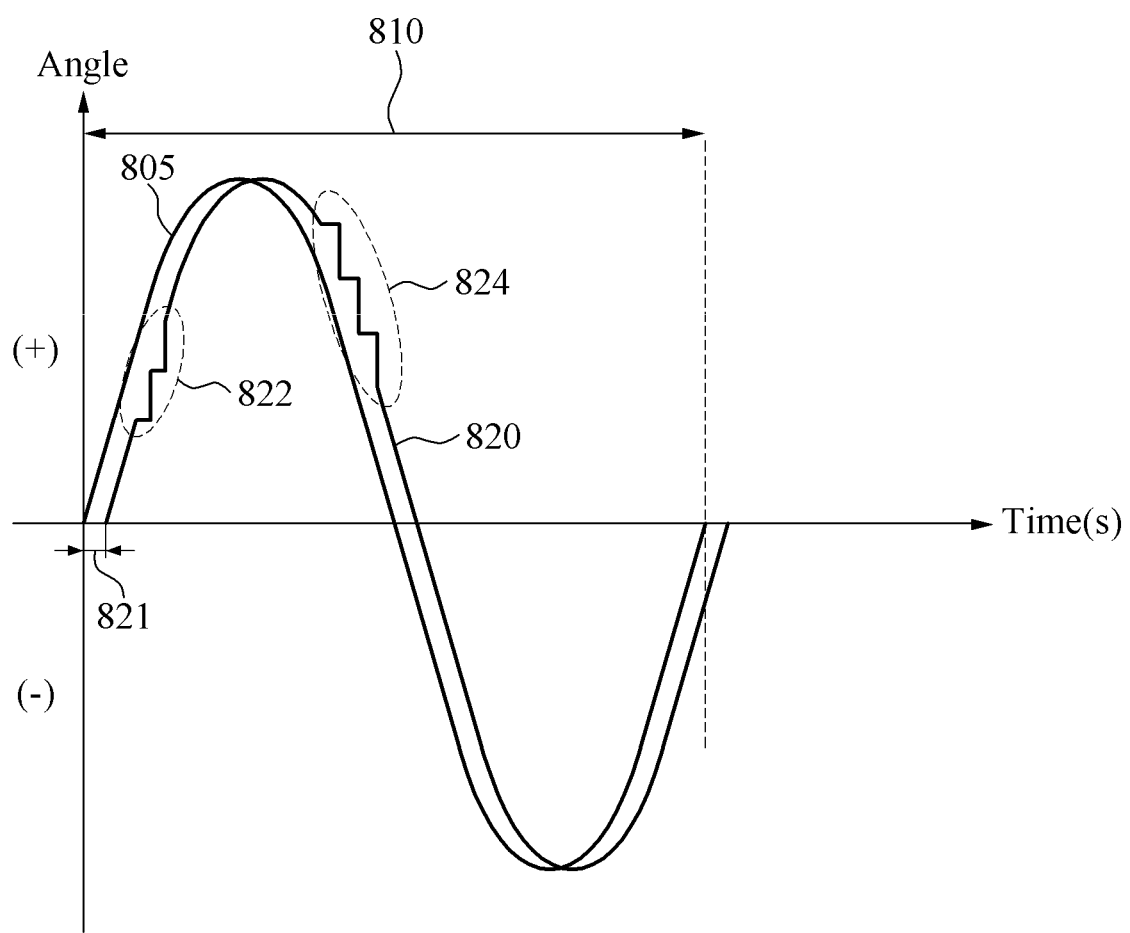
FIG. 8 is a graph illustrating an example of a pattern of generated data and a pattern of loaded data according to at least one example embodiment.

FIG. 8 is a graph illustrating an example of a pattern of generated data and a pattern of loaded data according to at least one example embodiment.

Referring to FIG. 8, a sensor may periodically generate data based on a data generation period. A generated plurality of pieces of data, for example, data 805 as illustrated, may have a periodic pattern. For example, when a user walks in a same motion, a pattern of the data 805 generated by such a walk may be a repetition of an interval 810. The data 805 may be associated with a movement of a portion of a body of the user. The portion of the body used herein refers to a portion that may move on a periodic basis in response to a walking motion of the user and may include, for example, a hip joint, a knee joint, an ankle joint, a shoulder joint, an arm, and a leg. However, the portion of the body may not be limited to the examples described in the foregoing.

The sensor may transmit the generated data to the communicator 310 connected thereto through wireless communication. The communicator 310 may receive the data from the sensor connected thereto through wireless communication, and store most recently received data in one or more of the communicator 310 and the memory 330. The communicator 310 may maintain previously received data when new data is not received from the sensor, and update the previously received data with the new data when the new data is received. When the processor 320 loads the data stored in the communicator 310 and/or the memory 330, the processor 320 may load the data most recently received by the communicator 310.

However, in such a data transmission between the sensor and the communicator 310, a delay 821 may occur as illustrated due to a wireless interval. The delay 821 may be maintained constantly unless the wireless interval changes.

In the data transmission between the sensor and the communicator 310, an additional delay may occur due to a jitter. The delay may occur irregularly due to the jitter, and a length of the delay may not be predicted. The delay occurring due to the jitter may be longer than the delay occurring due to the wireless interval in terms of a length. In response to the delay occurring due to the jitter, the communicator 310 may not receive recent data at a scheduled time. When the recent data is not received, the data stored in the communicator 310 and/or the memory 330 may not be updated, and the processor 320 may then load the data that is not updated.

As illustrated, in response to the delay occurring due to the jitter, a pattern 820 of the data loaded by the processor 320 may include abnormal data sections 822 and 824. Data in the abnormal data sections 822 and 824 may not reflect a current walking motion in real time. In a case in which the processor 320 determines a degree of progress in a gait cycle using the data in the abnormal data sections 822 and 824, the degree of progress that is different from an actual degree of progress may be determined. In addition, a torque to be output based on the degree of progress that is different from the actual degree of progress may not be properly used to assist the user with walking, and thus the user may experience inconvenience.

In contrast, in one or more example embodiments, in a case in which data that is not received is predicted based on previously received data when the data is not updated by the delay occurring due to the jitter, the processor 320 may update the data based on predicted data. Hereinafter, a method of updating data using predicted data in response to data not being updated by a delay occurring due to a jitter will be described in greater detail with reference to FIGS. 9 through 13.

Figure 9:
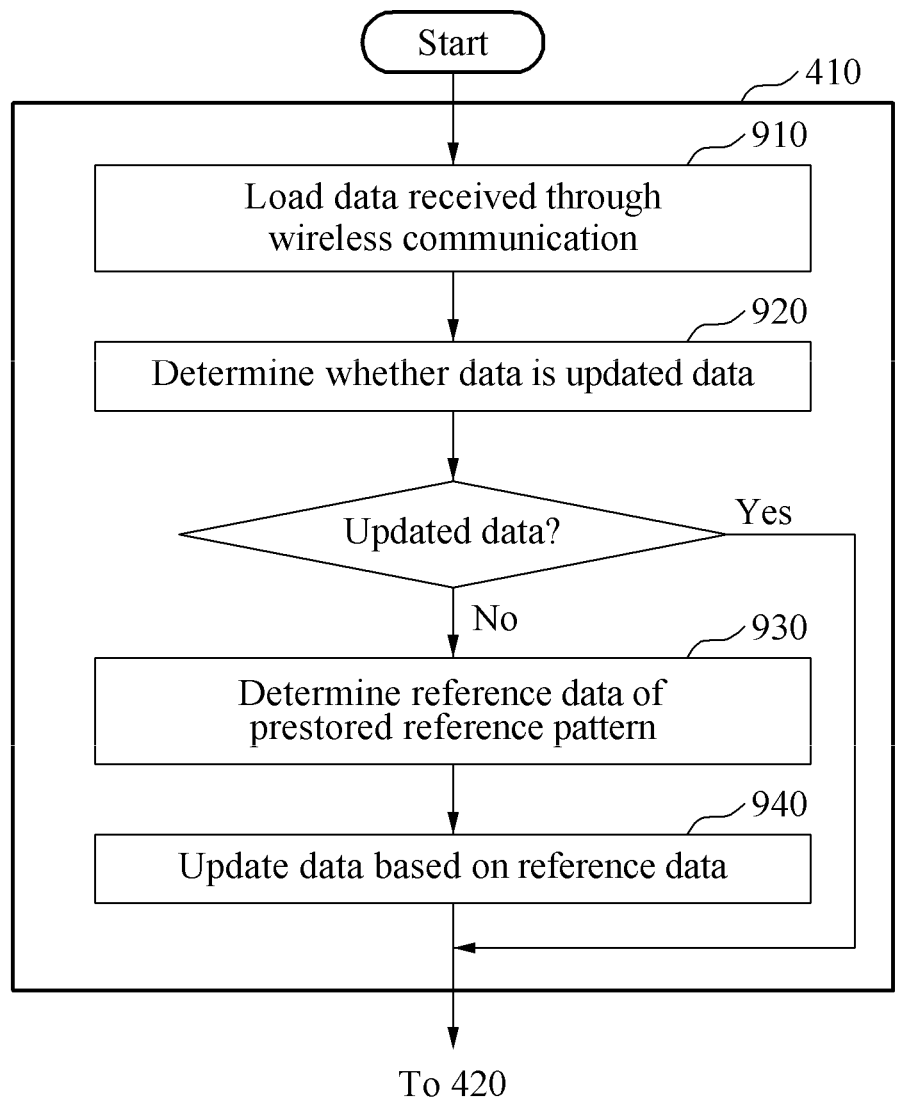
FIG. 9 is a flowchart illustrating an example of a method of loading data according to at least one example embodiment.

FIG. 9 is a flowchart illustrating an example of a method of loading data according to at least one example embodiment.

Operation 410 described above with reference to FIG. 4 may include operations 910 through 940 to be described hereinafter with reference to FIG. 9.

Referring to FIG. 9, in operation 910, the processor 320 loads data received by the communicator 310 through wireless communication. For example, the processor 320 may load data stored in a buffer of the communicator 310 and/or in the memory 330. The loaded data may be data most recently received by the communicator 310 from a sensor.

In operation 920, the processor 320 determines whether the loaded data is updated data. In response to the data being the same as previously loaded data, the processor 320 may determine that the loaded data is not updated data.

The processor 320 may determine whether the loaded data is updated data using an identifier of the data. The identifier of the data may include at least one of a field indicating whether the data has been loaded, or a timestamp of the data. For example, the communicator 310 and/or the processor 320 may update the at least one field of the data stored in the buffer when the data is loaded from the buffer by the processor 320, and the processor 320 may determine that subsequently loaded data is not updated data when the identifier is present in the field of the subsequently loaded data. For another example, when the data includes the timestamp, the processor 320 may determine whether the loaded data is updated data or not based on the timestamp. The timestamp may indicate a time at which the data is generated by the sensor, or a time at which the communicator 310 receives the data.

In response to a determination that the loaded data is updated data, the processor 320 may perform operation 420 described above with reference to FIG. 4. Conversely, in response to a determination that the loaded data is not updated data, the processor 320 may subsequently perform operation 930.

In operation 930, the processor 320 determines reference data of a desired (or, alternatively, a prestored) reference pattern based on the loaded data. In a case in which data received from the sensor has a periodic pattern, data that is not received due to a delay may be predicted using the desired (or, alternatively, the prestored) reference pattern. A method of determining reference data will be described in greater detail with reference to FIGS. 10 through 12.

Alternatively, in some other example embodiments, the processor 320 may attempt to re-retrieve the updated data one or more times prior to switching to the reference data. Therefore, in an event of a temporary delay in communication, the processor 320 may utilize the measured updated data rather than the reference data.

In operation 940, the processor 320 updates the data using the reference data. For example, the processor 320 may update the data by changing the loaded data 820 to the reference data.

Thereafter, the processor 320 may switch back to using the measured data during a subsequent stage of the gait cycle, if the processor 320 determines that the measured data is updated.

Figure 10:
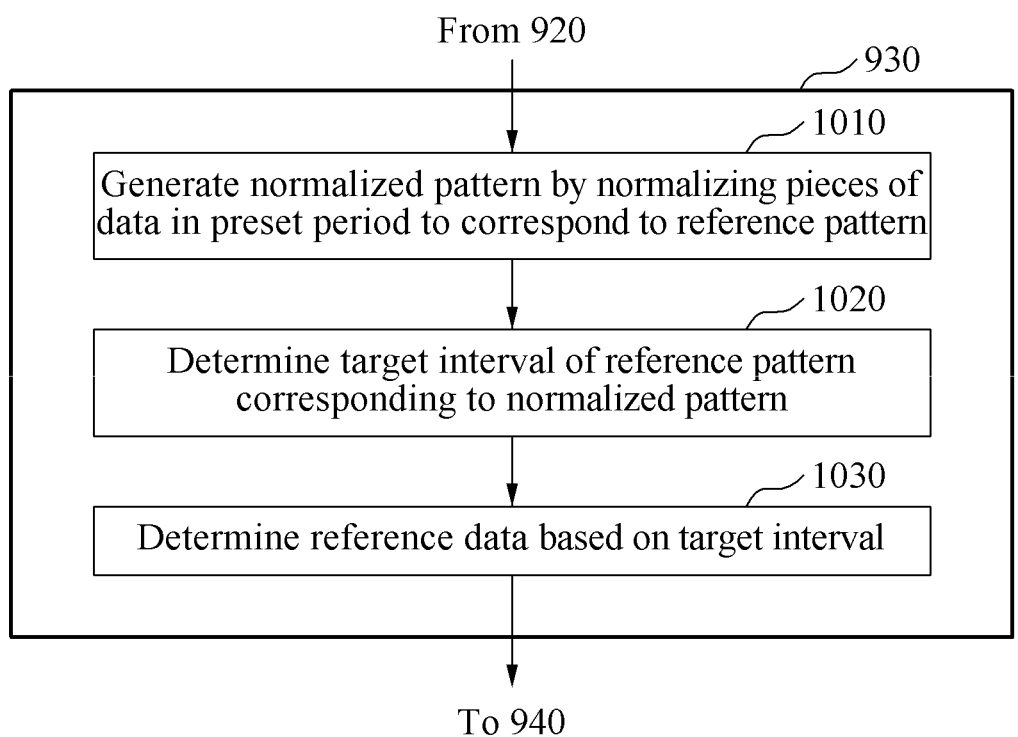
FIG. 10 is a flowchart illustrating an example of a method of determining reference data of a reference pattern according to at least one example embodiment.

FIG. 10 is a flowchart illustrating an example of a method of determining reference data of a reference pattern according to at least one example embodiment.

Operation 930 described above with reference to FIG. 9 may include operations 1010 through 1030 to be described hereinafter with reference to FIG. 10.

Referring to FIG. 10, in operation 1010, the processor 320 generates a normalized pattern by normalizing pieces of data including loaded data in a desired (or, alternatively, a preset) period to correspond to a reference pattern. The desired (or, alternatively, the preset) period used herein may refer to a period including a desired (or, alternatively, a preset) number of pieces of data. The desired (or, alternatively the preset) period may correspond to one pattern among periodic patterns indicated by the pieces of data, or one period of the periodic patterns. The reference pattern may be stored, in advance (e.g., prior to loading the data), in the memory 330. The reference pattern used herein may refer to a pattern that is predicted to be indicated by the pieces of data when the pieces of data are normally received.

The processor 320 may normalize the pieces of data in the desired (or, alternatively, the preset) period to correspond to the reference pattern. For example, the processor 320 may change the desired (or, alternatively, the preset) period to correspond to the reference pattern, change a maximum value among the pieces of data in the desired (or, alternatively, the preset) period to correspond to a maximum value of the reference pattern, and change a minimum value among the pieces of data in the desired (or, alternatively, the preset) period to correspond to a minimum value of the reference pattern. A method of generating a normalized pattern by normalizing pieces of data in a desired (or, alternatively, a preset) period to correspond to a reference pattern will be described in greater detail with reference to FIG. 11.

In operation 1020, the processor 320 determines a target interval of the reference pattern that corresponds to the normalized pattern. A method of determining a target interval will be described in greater detail with reference to FIG. 12.

In operation 1030, the processor 320 determines reference data based on the target interval. For example, the processor 320 may determine last data in the target interval to be the reference data.

Figure 11:
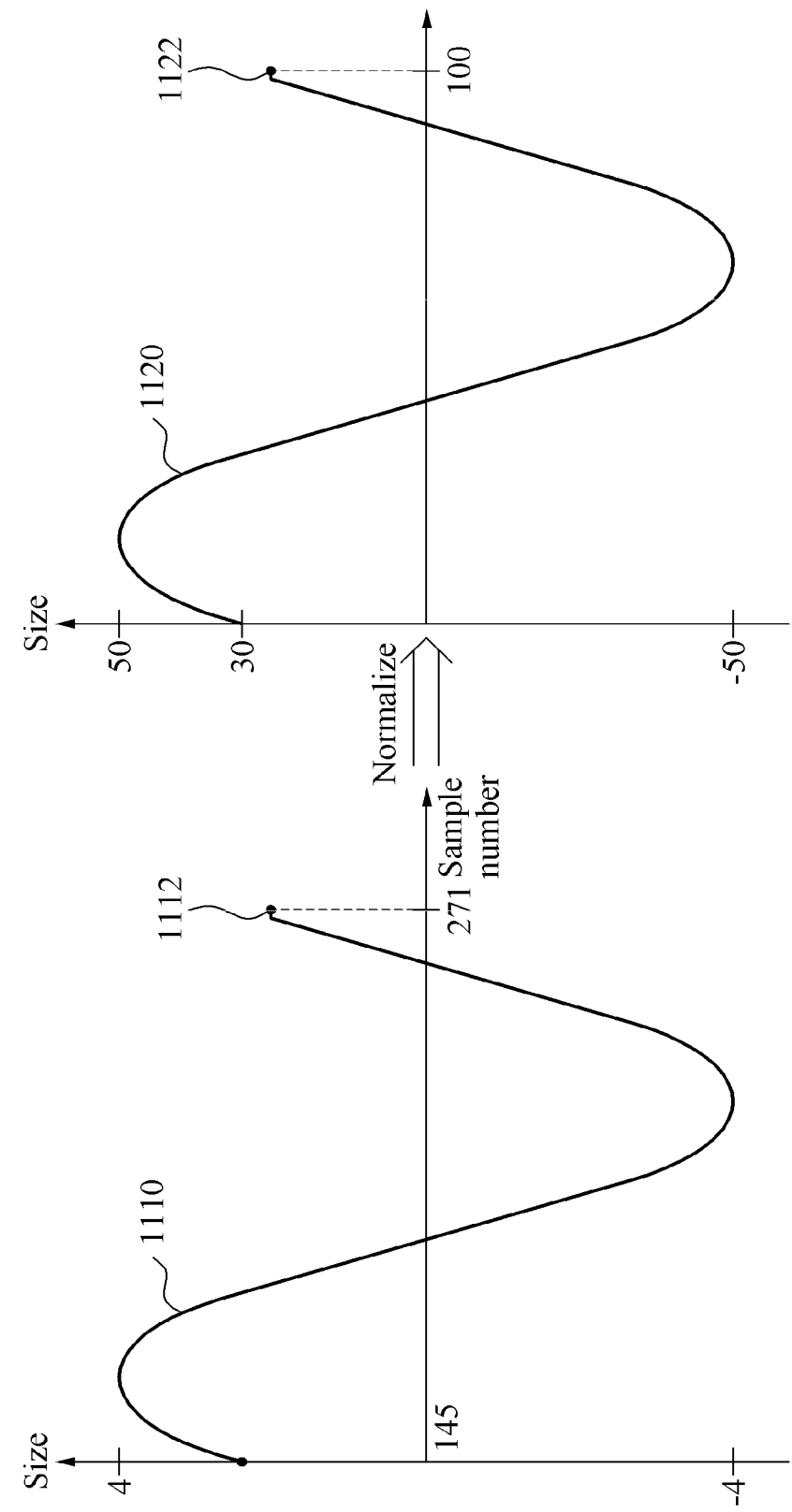
FIG. 11 is a graph illustrating an example of a normalized pattern generated by normalizing pieces of data in a preset period according to at least one example embodiment.

FIG. 11 is a diagram illustrating an example of a normalized pattern generated by normalizing pieces of data in a desired (or, alternatively, a preset) period according to at least one example embodiment.

Referring to FIG. 11, when loaded data 1112 is not updated data, pieces of data 1110 including the data 1112 in a desired (or, alternatively, a preset) period may be determined. Each data may indicate a size. A type of a size may vary based on a sensor that generates data. For example, data generated by an angle sensor may indicate an angle, or an angle value. For another example, data generated by a pressure sensor may indicate a pressure, or a pressure value. The pieces of data 1110 in the desired (or, alternatively, the preset) period may include 145th data through 271st data as illustrated.

Based on a sensor generating data, a target reference pattern may be determined among a plurality of reference patterns. For example, in a case in which an ankle angle sensor generates data, a reference pattern associated with the ankle angle sensor may be determined.

The processor 320 may generate a normalized pattern 1120 by normalizing the data 1110 in the desired (or, alternatively, the preset) period to correspond to the determined target reference pattern. The loaded data 1112 may correspond to last data 1122 of the normalized pattern 1120.

Figure 12:
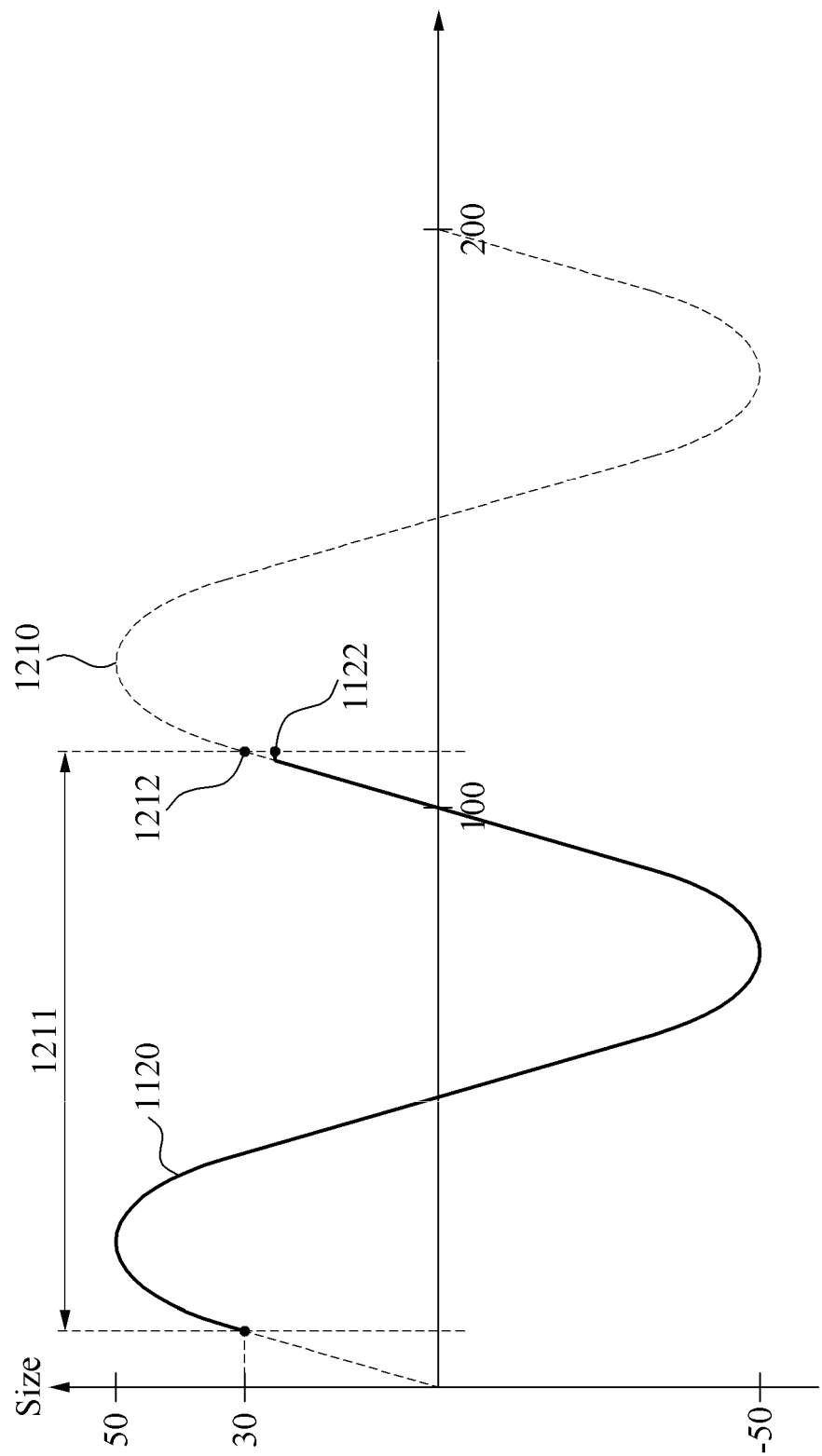
FIG. 12 is a graph illustrating an example of a target interval of a reference pattern corresponding to a normalized pattern according to at least one example embodiment.

FIG. 12 is a diagram illustrating an example of a target interval of a reference pattern corresponding to a normalized pattern according to at least one example embodiment.

Referring to FIG. 12, a reference pattern 1210 may include two periods, for example, a first period spanning from 0 to 100 on an x axis and a second period spanning from 100 to 200 on the x axis.

A target interval 1211 of the reference pattern 1210 that corresponds to a normalized pattern 1120 may be determined. For example, the processor 320 may determine, to be the target interval 1211, an interval having a smallest error between a plurality of intervals of the normalized pattern 1120 and the reference pattern 1210, while moving the normalized pattern 1120 on the x axis.

To improve a processing speed, the target interval 1211 may be determined using feature data of the normalized pattern 1120. The feature data may be, for example, start data, data having a maximum value, and/or data having a minimum value of the normalized pattern 1120. The processor 320 may determine a location of data of the reference pattern 1210 corresponding to the feature data, and compare the normalized pattern 1120 to the determined location. For example, when an error calculated with respect to the location is less than or equal to a threshold value, the processor 320 may determine the target interval 1211 based on the determined location without comparing other locations.

Last data of the target interval 1211 may be determined to be reference data 1212. When normal data is received from a sensor, it is more likely that the normal data is the reference data 1212 than data 1122, and thus updating data using the reference data 1212, instead of the data 1122 that is not updated data, may be more effective in an actual walking motion of a user. The data updated using the reference data 1212 may be used to output a torque of a walking assistance device.

Although not illustrated, updating the reference pattern 1210 may be additionally performed. The processor 320 may update the reference pattern 1210 based on the normalized pattern 1120. For example, the processor 320 may update the reference pattern 1210 by changing the target interval 1211 of the reference pattern 1210 to the normalized pattern 1120. The data 1122 may be excluded from the updating. For another example, the processor 320 may update the reference pattern 1210 by applying a weight to data of the target interval 1211 and data of reference pattern 1210.

Figure 13:
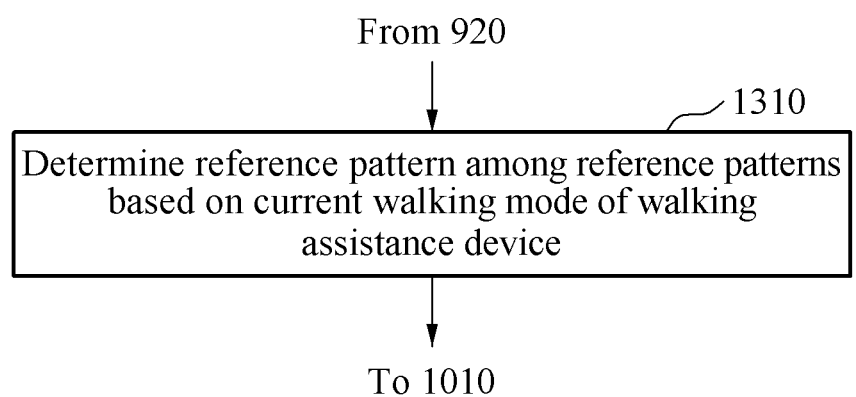
FIG. 13 is a flowchart illustrating an example of a method of determining a reference pattern among a plurality of reference patterns according to at least one example embodiment.

FIG. 13 is a flowchart illustrating an example of a method of determining a reference pattern among a plurality of reference patterns according to at least one example embodiment.

Operation 930 described above with reference to FIGS. 9 and 10 may further include operation 1310 to be described hereinafter with reference to FIG. 13. Operation 1310 may be performed before operation 1010 described above with reference to FIG. 10 is performed.

Referring to FIG. 13, in operation 1310, the processor 320 determines a reference pattern among a plurality of reference patterns based on a current walking mode of a walking assistance device. For example, the walking assistance device may operate in any one of a flat ground mode, an upward slope mode, a downward slope mode, and a stair mode, and reference patterns associated with each of the modes may be stored in the memory 330. For another example, the walking assistance device may operate in any one of a plurality of modes associated with a walking speed, and reference patterns associated with each of the modes may be stored in the memory 330.

A walking assistance device, and a torque outputting method for the walking assistance device have been described above with reference to FIGS. 1 through 13, and a data updating method has also been described as an example thereof.

Hereinafter, how to update data when the data is not updated data, although not to be used for a walking assistance device, will be described in detail with reference to FIGS. 14 and 15.

Figure 14:
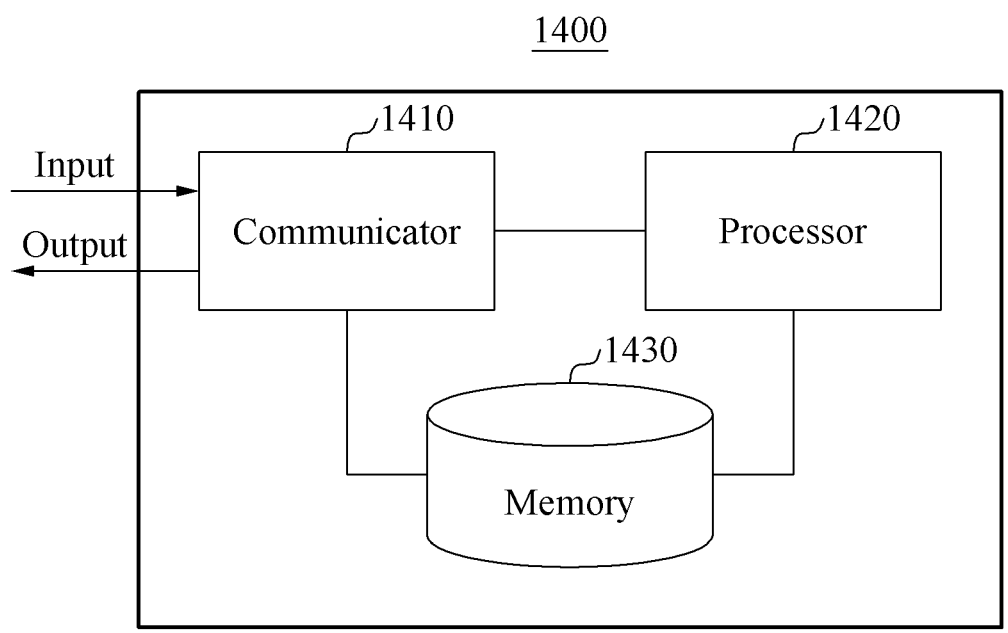
FIG. 14 is a diagram illustrating an example of a data updating device according to at least one example embodiment.

FIG. 14 is a diagram illustrating an example of a data updating device according to at least one example embodiment.

Referring to FIG. 14, a data updating device 1400 includes a communicator 1410, a processor 1420, and a memory 1430. The data updating device 1400 may be included in a device configured to received data from another device through wireless communication. For example, the data updating device 1400 may be included in the torque outputting device 300 described above with reference to FIGS. 3 through 13.

The communicator 1410 may be connected to the processor 1420 and the memory 1430 to exchange data. The communicator 1410 may also be connected to an external device to exchange data.

The communicator 1410 may be embodied by a circuitry in the data updating device 1400. For example, the communicator 1410 may include an internal bus and an external bus.

The communicator 1410 may connect the data updating device 1400 and the external device. The communicator 1410 may be an interface. The communicator 1410 may receive data from the external device, and transmit the data to the processor 1420 and the memory 1430. For example, the communicator 1410 may receive data from another device connected thereto through wireless communication. There is no limitation to the other device used herein, and pieces of data to be received may have a certain pattern or period. For example, a joint angle sensor may generate periodic data with respect to a gait cycle of a user.

The processor 1420 may process the data received by the communicator 1410 and the data stored in the memory 1430. The processor 1420 may execute computer-readable codes, for example, software, that are stored in a memory, for example, the memory 1430, and instructions from the processor 1420.

The memory 1430 may store the data received by the communicator 310 and the data processed by the processor 1420. For example, the memory 1430 may store a program. The program to be stored may be a set of syntaxes that may be coded to update data and implemented by the processor 1420.

The memory 1430 may include at least one volatile memory and nonvolatile memory, an RAM, a flash memory, a hard disk drive, or an optical disc drive.

The memory 1430 may store a command set, for example, software, to operate the data updating device 1400. The command set used to operate the data updating device 1400 may be implemented by the processor 1420.

The communicator 1410, the processor 1420, and the memory 1430 will be described hereinafter in greater detail with reference to FIG. 15.

Figure 15:
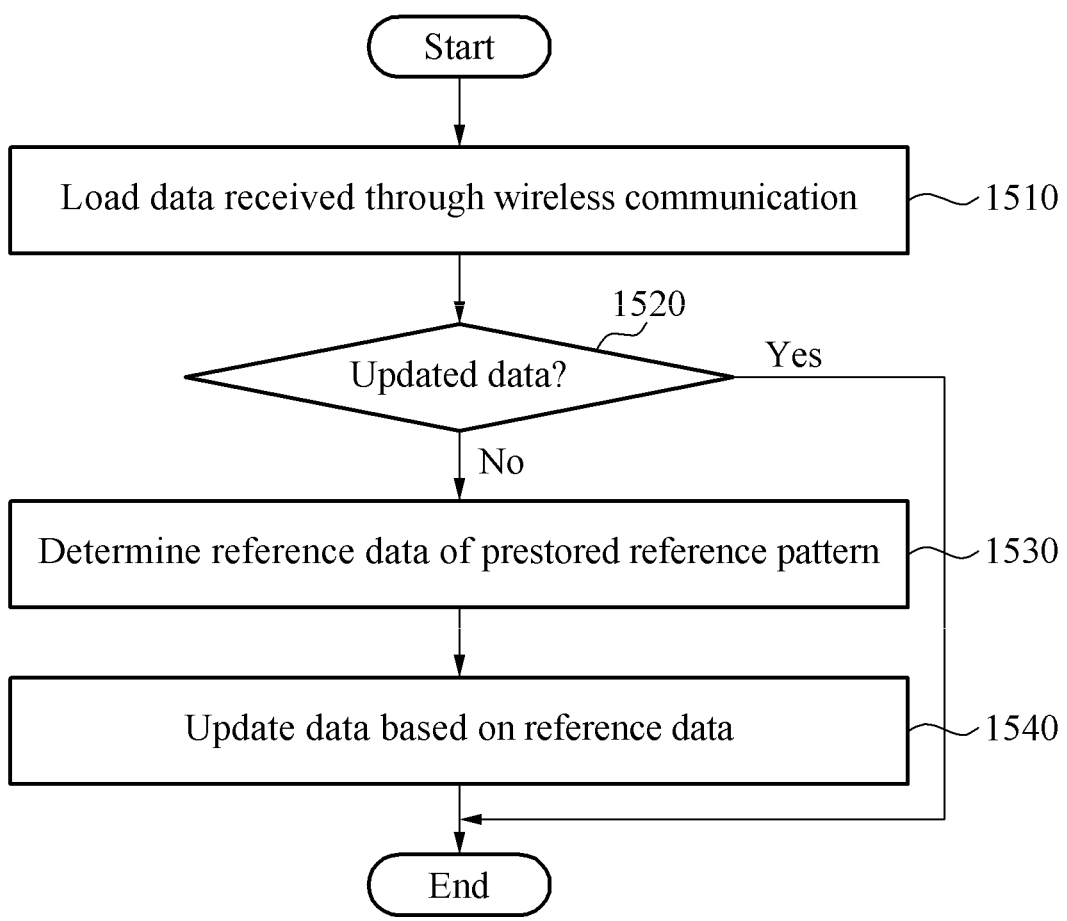
FIG. 15 is a flowchart illustrating an example of a data updating method according to at least one example embodiment.

FIG. 15 is a flowchart illustrating an example of a data updating method according to at least one example embodiment.

Operations 1510 through 1540 to be described hereinafter with reference to FIG. 15 may be performed by the data updating device 1400 described above with reference to FIG. 14.

Referring to FIG. 15, in operation 1510, the processor 1420 loads data received by the communicator 1410 from another device connected through wireless communication. The communicator 1410 may receive the data from the other device and store the received data in a buffer of the communicator 1410. The wireless communication may include, for example, Bluetooth, Wi-Fi, and Zigbee, but not limited thereto. The data loaded by the processor 1420 may be data that is most recently received by the communicator 1410 from the other device.

The data may be a measurement obtained by measuring a joint angle of a user of a walking assistance device. For example, the joint angle of the user may be at least one of a shoulder joint angle, a hip joint angle, a knee joint angle, or an ankle joint angle. The data may be used to calculate a torque of the walking assistance device.

In operation 1520, the processor 1420 determines whether the loaded data is updated data or not. In response to the data being the same as previously loaded data, the processor 1420 may determine that the loaded data is not updated data.

The processor 1420 may determine whether the loaded data is updated data using an identifier of the data. The identifier of the data may include at least one of a field indicating whether the data has been loaded or a timestamp of the data. For example, the communicator 1410 and/or the processor 1420 may update the at least one field of the data loaded by the processor 1420. When the identifier is present in the field of the loaded data, the processor 1420 may determine that subsequently loaded data is not updated data. For another example, in a case in which the data includes the timestamp, the processor 1420 may determine whether the subsequently loaded data is updated data based on the timestamp.

In response to the loaded data not being updated data, operation 1530 may be performed.

In operation 1530, the processor 1420 determines reference data of a desired (or, alternatively, a prestored) reference pattern based on the loaded data. In a case in which the data received from the other device has a periodic pattern, data that is not received due to a delay may be predicted using a desired (or, alternatively, a predetermined) or already known pattern. The method of determining the reference data has been described above with reference to FIGS. 10 through 12, and thus a more detailed and repeated description is omitted here for brevity.

In operation 1540, the processor 1420 updates the data using the reference data. For example, the processor 1420 may update the data by changing the loaded data to the reference data.

The updated data may be used to determine a degree of progress in a gait cycle of a user of the walking assistance device. The walking assistance device may calculate a torque to assist the user with walking based on the determined degree of progress, and provide an assistance force to the user based on the calculated torque.

Figure 16:
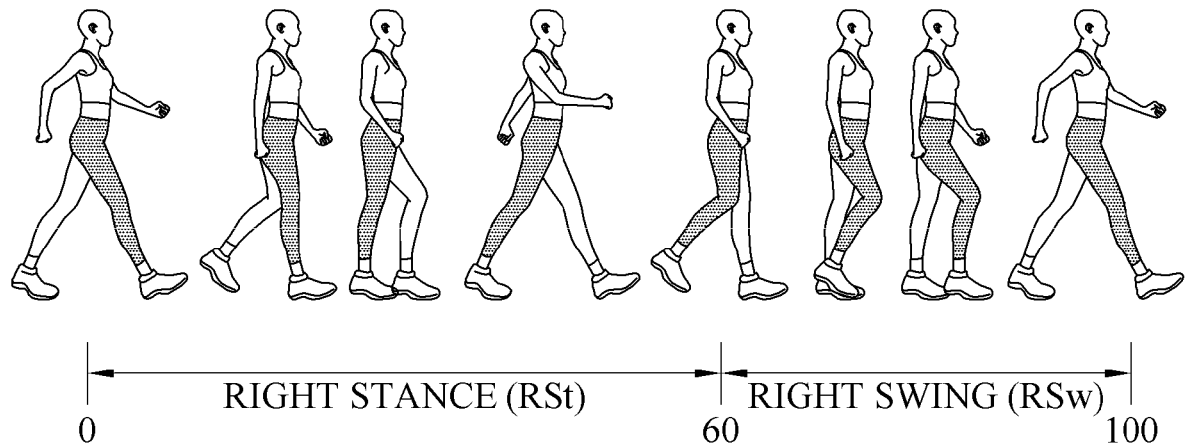
FIG. 16 illustrates gait states according to at least one example embodiment.
Figure 17:
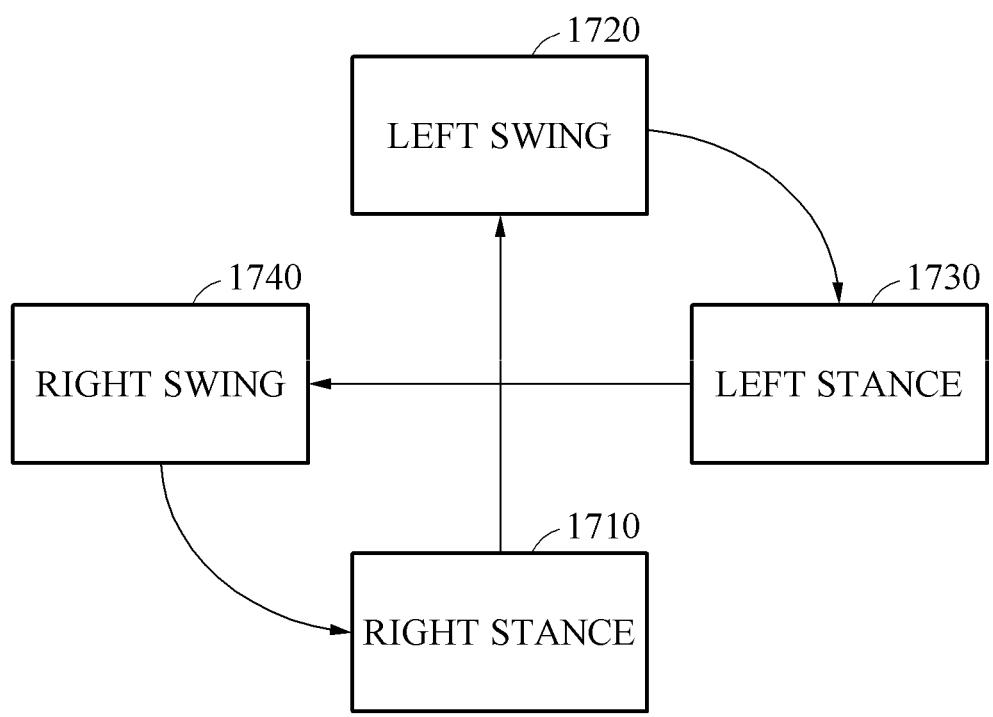
FIG. 17 illustrates a transition among gait states according to at least one example embodiment.

FIG. 16 illustrates gait states according to at least one example embodiment; and FIG. 17 illustrates a transition among gait states according to at least one example embodiment.

Referring to FIGS. 16 and 17, gait states of one of legs of a user with respect to a gait may be set (or, alternatively, predefined). For example, the gait states may include a stance and a swing. Gait states of a left leg may include a left stance (LSt) and a left swing (LSw). Gait states of a right leg may include a right stance (RSt) and a right swing (RSw).

While a gait state at a start of a gait may vary, a transition among gait states may occur in an order of a right stance 1710, a left swing 1720, a left stance 1730, and a right swing 1740. After the right swing 1740 is performed, the right stance 1710 may be re-performed.

In some example embodiments, the processor 320 may determine the degree of progress in the gait cycle with respect to a transition among the gait states included in the FSM based on the joint angle.

The units and/or modules described herein may be implemented using hardware components and software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of outputting a torque of a walking assistance device, the method comprising:
    loading data associated with the walking assistance device, the data being received via wireless communication, the loading including,
        determining whether the data is updated,
        determining a reference pattern among a plurality of stored reference patterns based on a current walking mode of the walking assistance device,
        determining reference data of the reference pattern based on the data in response to the data not being updated, and
        updating the data using the reference data;
    determining a degree of progress in a gait cycle based on the data;
    calculating a torque corresponding to the degree of progress; and
    outputting the torque to a driver of the walking assistance device.

2. The method of claim 1, wherein the data received through the wireless communication has a periodic pattern corresponding to the gait cycle.

3. The method of claim 1, wherein the determining whether the data is updated data comprises:
    determining whether the data is updated data using an identifier of the data.

4. The method of claim 3, wherein the identifier of the data includes at least one of a field indicating whether the data has been loaded, and a timestamp of the data.

5. The method of claim 1, wherein the determining the reference data of the reference pattern comprises:
    generating a normalized pattern by normalizing pieces of data including the data in a set period to correspond to the reference pattern;
    determining a target interval of the reference pattern such that the target interval corresponds to the normalized pattern; and
    determining the reference data based on the target interval.

6. The method of claim 5, wherein the generating of the normalized pattern comprises:
    normalizing a minimum value and a maximum value of the pieces of data in the set period such that the minimum value and the maximum value of the pieces of data correspond to a minimum value and a maximum value of the reference pattern, respectively.

7. The method of claim 5, wherein the set period corresponds to one period of the reference pattern.

8. The method of claim 5, wherein the determining the reference data based on the target interval comprises:
    setting last data in the target interval as the reference data.

9. The method of claim 1, wherein the data is a measurement of a joint angle of a user of the walking assistance device.

10. The method of claim 9, wherein the joint angle is at least one of a shoulder joint angle, a hip joint angle, a knee joint angle, and an ankle joint angle of the user.

11. A non-transitory computer-readable medium comprising computer-readable instructions executable by a computer to output a torque of a walking assistance device by,
    loading data associated with the walking assistance device, the data being received via wireless communication, the loading including,
        determining whether the data is updated,
        determining a reference pattern among a plurality of stored reference patterns based on a current walking mode of the walking assistance device,
        determining reference data of the reference pattern based on the data in response to the data not being updated, and
        updating the data using the reference data;
    determining a degree of progress in a gait cycle based on the data;
    calculating a torque corresponding to the degree of progress; and
    outputting the torque to a driver of the walking assistance device.

12. A device for outputting a torque of a walking assistance device, the device comprising:
    a memory configured to store a program; and
    a processor configured to execute the program to output a torque by,
        loading data associated with the walking assistance device, the loading including,
            determining whether the data is updated,
            determining a reference pattern among a plurality of stored reference patterns based on a current walking mode of the walking assistance device,
            determining reference data of the reference pattern based on the data in response to the data not being updated, and
            updating the data using the reference data;
        determining a degree of progress in a gait cycle based on the data;
        calculating a torque corresponding to the degree of progress; and
        outputting the torque to a driver of the walking assistance device.

13. A data updating method to update data having a periodic pattern, the data updating method comprising:
    loading data received through wireless communication;
    determining whether the data is updated data;
    determining a reference pattern among a plurality of stored reference patterns;
    determining reference data of the reference pattern based on the data, in response to the data not being updated; and
    updating the data using the reference data.

14. The data updating method of claim 13, wherein the determining whether the data is updated data comprises:
    determining whether the data is updated data using an identifier of the data.

15. The data updating method of claim 14, wherein the identifier of the data includes at least one of a field indicating whether the data has been loaded and a timestamp of the data.

16. The data updating method of claim 13, wherein the determining the reference data of the reference pattern comprises:

generating a normalized pattern by normalizing pieces of data including the data in a set period to correspond to the reference pattern;

determining a target interval of the reference pattern such that the target interval corresponds to the normalized pattern; and determining the reference data based on the target interval.

17. The data updating method of claim 16, wherein the generating of the normalized pattern comprises:

normalizing a minimum value and a maximum value of the pieces of data in the set period such that the minimum value and the maximum value of the pieces of data correspond to a minimum value and a maximum value of the reference pattern, respectively.

18. The data updating method of claim 16, wherein the set period corresponds to one period of the reference pattern.

19. The data updating method of claim 16, wherein the determining the reference data based on the target interval comprises:

setting last data in the target interval to be the reference data.

20. The data updating method of claim 13, wherein the data is a measurement of a joint angle of a user of a walking assistance device, the walking assistance device configured to calculate a torque based on the data.

21. The data updating method of claim 20, wherein the joint angle is at least one of a shoulder joint angle, a hip joint angle, a knee joint angle, and an ankle joint angle of the user.

22. The data updating method of claim 20, wherein the walking assistance device is configured to determine a degree of progress in a gait cycle of the walking assistance device based on the data, and to calculate the torque based on the degree of progress.

23. A non-transitory computer-readable medium comprising computer-readable instructions executable to cause a computer to update data having a periodic pattern by, loading data received through wireless communication;

determining whether the data is updated data;

determining a reference pattern among a plurality of stored reference patterns;

determining reference data of the reference pattern based on the data, in response to the data not being updated; and updating the data using the reference data.

* * * * *